United States Patent [19]

Jane Cabagnero

[11] 4,042,274
[45] Aug. 16, 1977

[54] COLLAPSIBLE FRAME FOR CARRIAGES

[76] Inventor: Ramon Jane Cabagnero, 49-53 Nena Casas, Barcelona, Spain

[21] Appl. No.: 652,148

[22] Filed: Jan. 26, 1976

[30] Foreign Application Priority Data

June 3, 1975 Spain .................................. 213229

[51] Int. Cl.² .......................... B62D 23/00; B62B 7/00
[52] U.S. Cl. ..................................... 296/1 B; 280/650
[58] Field of Search ................ 296/1 B; 280/642, 643, 280/644, 647, 650; D12/129

[56] References Cited

U.S. PATENT DOCUMENTS

| 873,283 | 12/1907 | Wolfenden | 280/642 |
| 2,573,106 | 10/1951 | Macip | 280/642 |
| 3,100,652 | 8/1963 | Schenkman | 280/644 |
| 3,421,774 | 1/1969 | Patterson | 280/642 |
| 3,873,116 | 3/1975 | Perego | 280/650 |

FOREIGN PATENT DOCUMENTS 508,026  12/1954  Canada ................................. 280/644

Primary Examiner—Joseph E. Peters, Jr.
Assistant Examiner—John A. Carroll
Attorney, Agent, or Firm—Toren, McGeady and Stanger

[57] ABSTRACT

A collapsible carriage frame has a front leg pivoted intermediate its ends to a tie bar which is also pivoted to one end of a side member which supports a basket-bassinet. The other end of the side-member is pivoted to a rear leg of the frame. Both the front and rear legs are pivoted to a handlebar which upon rotation relative to the front leg will fold the frame and position all the members of the frame so they are approximately parallel to one another.

3 Claims, 2 Drawing Figures

COLLAPSIBLE FRAME FOR CARRIAGES

BACKGROUND OF THE INVENTION

The present invention is directed to a collapsible frame, and especially to a collapsible frame for use in perambulators, carriages, strollers, and the like.

There are many well-known types of collapsible frames which typically rely on a scissors-type linkage for folding and opening. These prior art mechanisms, however, are often difficult to manipulate and hard to keep in the open position.

SUMMARY OF THE INVENTION

It is, therefore, the primary object of the present invention to provide a collapsible frame for use in a carriage and the like which is easily maneuverable, is foldable into a very small size for easy storage and transport, and can be produced simply and inexpensively.

The collapsible frame of the present invention has a front leg portion pivotally connected to a tie bar that is also pivotally connected to a side member which supports a basket-bassinet, and the like. Further, the side member is pivotally connected to a rear leg of the frame, and both the front and rear legs are pivotally connected to a handlebar. Upon rotation of the handlebar relative to the front leg, the entire frame collapses and folds into a compact arrangement. Moreover, in order to allow for such collapse and to give the frame structural integrity, the side member has a curved portion which is pivoted to the rear leg.

The present invention affords a collapsible carriage or stroller by providing two parallel collapsible frames mounted on a front and a rear wheel-axle arrangement. Further, this type of collapsible frame does not interfere with cross folding where such a feature is required in strollers and similar vehicles for children.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there is illustrated and described a preferred embodiment of the invention.

DETAILED DESCRIPTION OF THE INVENTION

Figure 1:
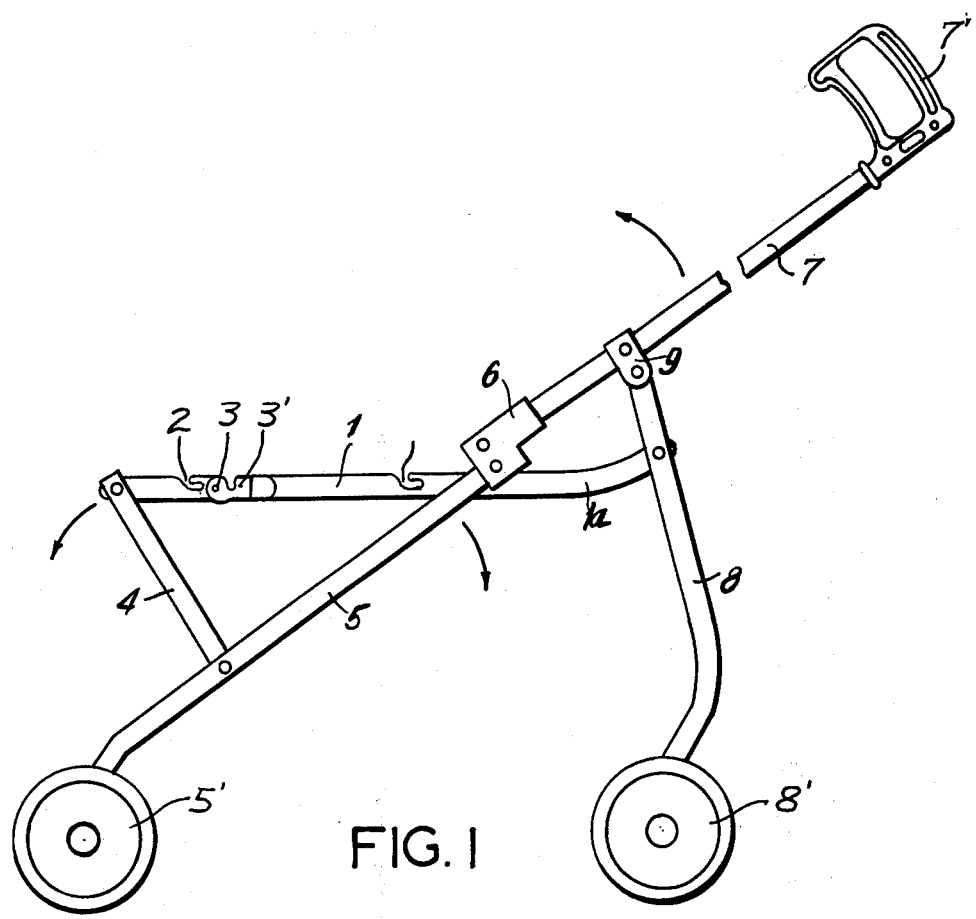
FIG. 1 is a side view showing the improved collapsible frame of the present invention in its open condition.
Figure 2:
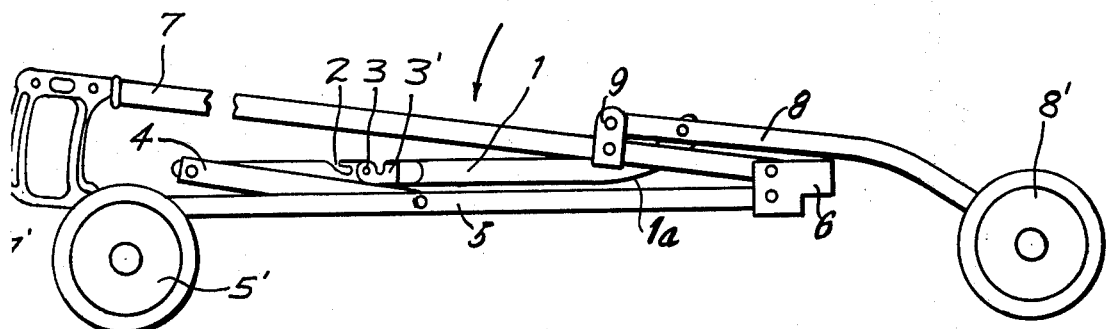
FIG. 2 is a side view showing the improved collapsible frame of the present invention in its folded, collapsed condition.

Referring now to the drawing, FIGS. 1 and 2 illustrate the improved collapsible frame of the invention. The collapsible frame which is placed on each side of a carriage, stroller or similar vehicle, is made up of a front leg 5 on the forward end which is mounted on a front wheel-axle arrangement 5. Pivoted intermediate the ends of the front leg 5 is a tie bar 4 which is pivoted at its other end to one end of a side member 1. The side member 1 has a pair of notches 2 spaced along its length with the notches arranged to receive side lugs 2' on a basket-bassinet B, or similar carrier. On the side member 1 located between the notches, is a pin or connector 3 for coupling a hook-catch 3' which also engages with one of the side lugs 2' of the basket-bassinet B shown spaced from its support. The other end of the side member 1, remote from the tie bar 4, is pivotally connected to a rear leg 8 intermediate its ends. At one end, the rear leg is pivotally connected to a conventional rear wheel-axle arrangement 8' while its other end is pivotally connected to a handlebar 7 via a flange 9. The handlebar 7 is, in turn, also pivotally attached to the upper end of the front leg 5 via a shaped flange 6 and it has a rectangular ring-shaped handle 7' at its free end. The handlebar is rotatable relative to the flange 6 which is fixedly attached to the end of the front leg 5. The side member is inflected or bent adjacent its opposite end from the tie bar 4 and forms a slightly curved portion 1a which is connected to the rear leg 8 at a position between the ends of the rear leg. While the portion 1a is shown slightly curved it could be straight but disposed angularly to the remainder of the side member 1 because of the bend or inflection in the side member.

In operation, assuming the collapsible frame is in its open condition as shown in FIG. 1, the collapsible frame is folded into its collapsed condition shown in FIG. 2 by rotating the handlebar 7 counterclockwise as shown by the arrow in FIG. 1. The rotation of the handlebar 7 about the upper end of the front leg 5 carries with it the rear leg 8 which is pivoted to the side member 1. Continued rotation of the handlebar in the counterclockwise direction places the front leg in a horizontal position, while displacing the tie bar 4 and the side member 1 into an approximately horizontal position. After the handlebar has reached the position shown in FIG. 2, the rear leg 8 is approximately horizontal and extends outwardly from the upper end of the front leg 5. It is noted that, since the side member 1 is pivotally connected to the rear leg 8, the rear leg is forced into its collapsed position shown in FIG. 2 by the downward movement of the side member 1 in response to downward movement of the handlebar 7.

The handlebar 7 can be held in the open position shown in FIG. 1 by various known locking devices.

While a specific embodiment of the invention has been shown and described, it is to be understood that numerous changes and modifications may be made without departing from the scope and spirit of the invention.

What is claimed is:

1. An improved collapsible frame for carriages with said frame having an open condition and a folded condition and comprising a front leg member having a first end and a second end, a tie bar having a first end pivotally connected to said front leg member intermediate the ends thereof and a second end, a side member for supporting a basket-bassinet or the like and having a first end pivotally connected to said second end of said tie bar and a second end, a rear leg member having a first end and a second end, said second end of said side member being pivotally connected to said rear leg member intermediate the ends thereof, and a handlebar having a first end and a second end with the second end being pivotally connected to said second end of said front leg member, said second end of said rear leg member also being pivotally connected to said handlebar at a position intermediate said ends of said handlebar.

2. The improved collapsible frame according to claim 1, wherein said side member has a bend therein intermediate the first and second end thereof so that the portion of said side member between the bend and the second end thereof is disposed at an angle to the portion of said side member between the bend and the first end thereof.

3. The improved collapsible frame according to claim 2, wherein in the open condition of said frame said portion of said side member between the bend and the second end thereof extends upwardly from the portion of said side member between the bend and the first end thereof toward said handlebar.

* * * * *